US010628898B2

(12) United States Patent
Erestam

(10) Patent No.: US 10,628,898 B2
(45) Date of Patent: Apr. 21, 2020

(54) IDENTIFYING AND LOCATING A SUBSTITUTE BATTERY FOR A CONSTRUCTION JOB SITE POWER TOOL

(71) Applicant: HUSQVARNA AB, Huskvarna (SE)

(72) Inventor: Anders Erestam, Göteborg (SE)

(73) Assignee: Husqvarna AB, Huskvarna (SE)

(*) Notice: Subject to any disclaimer, the term of this patent is extended or adjusted under 35 U.S.C. 154(b) by 183 days.

(21) Appl. No.: 15/451,867

(22) Filed: Mar. 7, 2017

(65) Prior Publication Data

US 2017/0256006 A1 Sep. 7, 2017

(30) Foreign Application Priority Data

Mar. 7, 2016 (SE) .................. 16503054

(51) Int. Cl.
G06Q 50/08 (2012.01)
G06Q 10/06 (2012.01)
G06Q 10/08 (2012.01)
G01S 5/00 (2006.01)
G01S 19/14 (2010.01)

(52) U.S. Cl.
CPC ............ *G06Q 50/08* (2013.01); *G01S 5/0027* (2013.01); *G01S 19/14* (2013.01); *G06Q 10/06313* (2013.01); *G06Q 10/087* (2013.01)

(58) Field of Classification Search
CPC .... G06Q 50/08; G06Q 10/0631; G06Q 10/06; G06Q 10/083
See application file for complete search history.

(56) References Cited

U.S. PATENT DOCUMENTS

| 6,775,562 | B1* | 8/2004 | Owens | H04M 19/08 455/572 |
| 7,521,935 | B2* | 4/2009 | Uchida | G01R 31/3842 324/426 |
| 7,598,880 | B2* | 10/2009 | Powell | G01R 31/3648 340/636.1 |
| 7,627,427 | B2* | 12/2009 | Nichols | G01C 21/20 701/517 |
| 7,715,884 | B2* | 5/2010 | Book | H02J 7/0003 455/572 |
| 8,131,486 | B2* | 3/2012 | Leonard | H01M 10/482 702/63 |
| 8,294,424 | B2* | 10/2012 | Bucur | G01R 31/396 320/116 |

(Continued)

OTHER PUBLICATIONS

On!Track User Manual—Web Release 2.3.2, Manual Version 1.1 Hilti, 2016 (Year: 2016).*

(Continued)

*Primary Examiner* — Scott L Jarrett
(74) *Attorney, Agent, or Firm* — Burr & Forman LLP

(57) ABSTRACT

A construction site status monitoring device is provided including processing circuitry configured to receive a battery identifier data associated with respective construction device batteries of a plurality of construction device batteries, receive location data associated with the respective construction device batteries of the plurality of construction device batteries, and determine a substitute battery from the plurality of construction device batteries for a construction device battery of the plurality of construction device batteries based on the battery identifier data or the location data.

20 Claims, 5 Drawing Sheets

(56) References Cited

U.S. PATENT DOCUMENTS

| | | | | |
|---|---|---|---|---|
| 8,493,226 | B2* | 7/2013 | Tedesco | G08B 13/1427 340/539.1 |
| 8,862,388 | B2* | 10/2014 | Wu | B60L 1/003 701/22 |
| 8,983,657 | B2* | 3/2015 | Jacobson | G07C 9/00039 700/245 |
| 9,031,585 | B2* | 5/2015 | Kahle | G01C 15/00 455/457 |
| 9,430,370 | B2* | 8/2016 | Mergener | G06F 12/023 |
| 9,576,309 | B2* | 2/2017 | Bollman, IV | G06Q 30/0611 |
| 9,973,831 | B2* | 5/2018 | Mejegard | G06Q 10/06 |
| 10,013,678 | B2* | 7/2018 | Matsuyama | H01M 10/48 |
| 2003/0209375 | A1* | 11/2003 | Suzuki | B60K 1/04 180/65.22 |
| 2007/0120736 | A1* | 5/2007 | MacKenzie | G01S 13/825 342/357.66 |
| 2010/0181964 | A1* | 7/2010 | Huggins | H02J 17/00 320/108 |
| 2010/0277277 | A1* | 11/2010 | Green | G07C 9/00111 340/5.72 |
| 2011/0257879 | A1* | 10/2011 | Ishibashi | G01C 21/3469 701/533 |
| 2012/0078444 | A1* | 3/2012 | Mase | G06F 21/88 701/2 |
| 2012/0078553 | A1* | 3/2012 | Kuroda | B60L 3/0046 702/63 |
| 2012/0182132 | A1* | 7/2012 | McShane | H01M 10/488 340/10.51 |
| 2012/0191476 | A1* | 7/2012 | Reid | G06Q 50/24 705/3 |
| 2013/0054080 | A1* | 2/2013 | Jacobson | G07C 9/00039 701/29.3 |
| 2013/0109375 | A1* | 5/2013 | Zeiler | H04W 4/029 455/426.1 |
| 2013/0147617 | A1* | 6/2013 | Boling | G08B 21/18 340/431 |
| 2013/0332370 | A1* | 12/2013 | Hyde | B60L 11/1822 705/306 |
| 2014/0107853 | A1 | 4/2014 | Ashinghurst et al. | |
| 2014/0172285 | A1* | 6/2014 | Kuhn | B60L 11/1861 701/123 |
| 2014/0184397 | A1* | 7/2014 | Volpert | B25F 5/00 340/12.51 |
| 2014/0213301 | A1* | 7/2014 | Evans | H04W 4/21 455/456.3 |
| 2014/0319272 | A1* | 10/2014 | Casado Magana | B64F 1/04 244/110 E |
| 2014/0342193 | A1* | 11/2014 | Mull | H01M 10/4257 429/50 |
| 2015/0039391 | A1* | 2/2015 | Hershkovitz | G06Q 10/04 705/7.31 |
| 2015/0134546 | A1* | 5/2015 | Penilla | G06Q 20/18 705/305 |
| 2015/0149015 | A1* | 5/2015 | Nakano | B60L 11/1861 701/22 |
| 2016/0092847 | A1* | 3/2016 | Buchbinder | G06Q 10/20 705/26.8 |
| 2016/0277879 | A1* | 9/2016 | Daoura | H04W 4/80 |
| 2016/0303988 | A1* | 10/2016 | Kang | B65G 25/06 |
| 2017/0063114 | A1* | 3/2017 | Briere | H02J 7/0044 |
| 2017/0176539 | A1* | 6/2017 | Younger | G01R 31/367 |
| 2017/0222382 | A1* | 8/2017 | Peloquin | B25F 5/00 |
| 2018/0010919 | A1* | 1/2018 | Huang | G01C 21/3469 |
| 2018/0012196 | A1* | 1/2018 | Ricci | H04L 9/321 |
| 2018/0141453 | A1* | 5/2018 | High | G05D 1/0684 |

OTHER PUBLICATIONS

Trimble AllTrak Software—Quick start guide Version 3.5, Nov. 2012, Trimble (Year: 2012).*

Apps to Manage and Track Tools for Construction ConAppGuru.com, Aug. 2016 (Year: 2016).*

Marshall, Chris, Dewalt Tool Connect Battery App Rockler.com, Sep. 15, 2015 (Year: 2015).*

Dewalt Tool Connect —Manage Your Tools Anywhere Dewalt, 2017 (Year: 2017).*

Bosh TrackTag, A Bluetooth Tracking Device You Attach to Your Tools Toolguyd.com, Sep. 8, 2015 (Year: 2015).*

Marshall, Tool Connect Battery App Woodworker's Journal, Sep. 15, 2015 (Year: 2015).*

Hedmond, Shane, DeWalt's ToolConnect App and Bluetooth Batteries are Now Available and They Both Look Awesome ConstructionJunkie.com, Aug. 26, 2015 (Year: 2015).*

Dwalt Web Pages—XR Tool Connect Dewalt.co.nz/toolconnect, Oct. 18, 2015, Retrieved from Archive.org May 13, 2019 (Year: 2015).*

Milwaukee One-Key—Here is Everything You Want to Know Toolguyd.com, Jul. 30, 2015 (Year: 2015).*

Hedmon, Shane, Milwaukees ONE-Key Inventory Management Released: Here's How to Use It ConstructionJunkie.com, Sep. 21, 2015 (Year: 2015).*

* cited by examiner

IDENTIFYING AND LOCATING A SUBSTITUTE BATTERY FOR A CONSTRUCTION JOB SITE POWER TOOL

CROSS REFERENCE TO RELATED APPLICATIONS

This application claims priority to Swedish application number 1650305-4 filed Mar. 7, 2016, the entire contents of which are hereby incorporated in its entirety.

TECHNICAL FIELD

Example embodiments generally relate to construction equipment and, more particularly, relate to a construction site battery network.

BACKGROUND

Construction equipment includes such devices as saws, drills, generators, nail guns, demolition robots, and the like. These devices are often used to perform tasks that inherently produce debris, and they are also inherently required to be mobile. Accordingly, these devices are typically made to be relatively robust and capable of handling difficult work in hostile environments, while balancing the requirement for mobility. However, these devices typically also include some form of working assembly or element that is capable of cutting working material, breaking working materials, drilling holes, driving nails or rivets, or the like. In some instances, a construction device may utilize a battery to provide power for operation of the construction device and working assembly.

Construction device batteries may have limited stored energy to support construction device operation. In an instance in which a construction device battery becomes depleted, the construction device operation may be degraded or the construction device may stop functioning. An operator may search a construction site, battery charging stations, or storage lockers for construction device batteries which are compatible with the construction device, e.g. physically and electronically fit the construction device and have an appropriate voltage rating. Further, in an instance in which the operator finds a compatible battery, they may also have to check the charge status of the construction device battery to find a construction device battery with sufficient charge to continue the construction device operation.

In some instances, battery charge status may be determined by checking on battery indicators and charging station indicators. Other methods of checking the charge status of the battery may require the battery to be connected to the construction device, such as a battery charge indicator on the construction device or operationally testing the construction device. These methods of locating and checking the charge status of construction device batteries are time consuming and waste valuable man hours.

Construction device batteries vary in size, but are typically not large, which could lead to misplacement in a construction site. Additionally, construction device batteries may be a high value and easily portable item in a construction site. The value and portability of construction device batteries may lead to theft of the batteries reducing the available inventory of construction device batteries and increasing the time consumed locating substitute construction device batteries.

BRIEF SUMMARY OF SOME EXAMPLES

In an example embodiment, a construction site status monitoring device is provided including processing circuitry configured to receive battery identifier data associated with respective construction device batteries of a plurality of construction device batteries, receive location data associated with the respective construction device batteries of the plurality of construction device batteries, and determine a substitute battery from the plurality of construction device batteries for a construction device battery of the plurality of construction device batteries based on the battery identifier data or the location data.

In another example embodiment, a construction site status monitoring system is provided including a plurality of construction batteries and a construction site status monitoring device. The construction site status monitoring device includes processing circuitry configured to receive battery identifier data associated with respective construction device batteries of a plurality of construction device batteries, receive location data associated with the respective construction device batteries of the plurality of construction device batteries, and determine a substitute battery from the plurality of construction device batteries for a construction device battery of the plurality of construction device batteries based on the battery identifier data or location data.

In yet a further example embodiment, a construction site status monitoring device is provided including processing circuitry configured to receive battery identifier data associated with a construction device battery, receive location data associated with the construction device battery, compare the location data of the construction device battery to a loss prevention threshold, and disable the construction device battery based on satisfying the loss prevention threshold.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
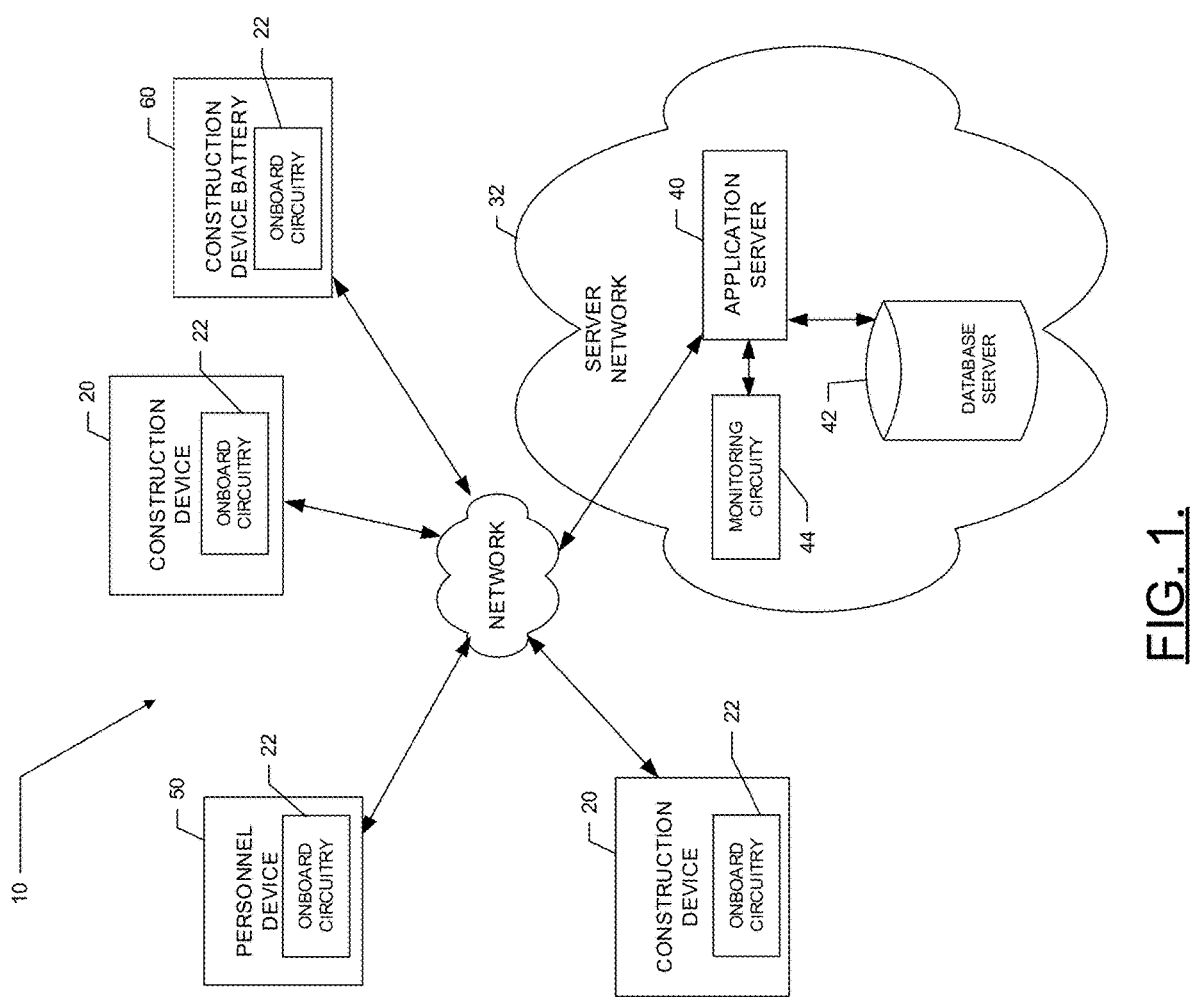
FIG. 1 illustrates a block diagram of a system according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments described herein provide a construction site status monitoring device that may be employed on any of a number of different construction devices. The construction site status monitoring device may receive battery identifiers and location data from a plurality of construction device batteries. The construction site status monitoring device may determine substitute construction device batteries for the construction devices, for example, if a construction device battery has a low or no charge status.

In some embodiments, the construction site status monitoring device may monitor the location of construction device batteries and disable construction device batteries which leave the construction site. Monitoring the battery location may prevent misplacement of the construction device batteries within the construction site and may enable disabling construction site batteries which leave the construction site to discourage theft.

In an example embodiment, a substitute construction device battery location and/or identification may be displayed on a user interface upon request or automatically, in an instance in which limited operation of the construction device is determined.

FIG. 1 illustrates an example system in which an embodiment of the present invention may be employed. In this regard, FIG. 1 illustrates a generic example of a system in which various devices that are examples of construction equipment may utilize a network for the performance of construction site coordination according to an example embodiment. As shown in FIG. 1, a system 10 according to an example embodiment may include one or more client devices (e.g. construction devices 20 and personnel devices 50, and in some instances construction device batteries 60). Notably, although FIG. 1 illustrates four devices 20, 50, 60, 60 it should be appreciated that many more devices 20, 50, 60, 60 may be included in some embodiments and thus, the four devices 20, 50, 60 of FIG. 1 are simply used to illustrate a multiplicity of devices 20, 50, 60 and the number of devices 20, 50, 60 is in no way limiting to other example embodiments. In this regard, example embodiments are scalable to inclusion of any number of devices 20, 50, 60 being tied into the system 10. Moreover, it should be appreciated that FIG. 1 illustrates one example embodiment in which shared resources may be allocated within a community of networked devices (e.g. devices 20, 50, 60). However, it should be appreciated that the architecture of various example embodiments may vary. Thus, the example of FIG. 1 is merely provided for ease of explanation of one example embodiment and should not be considered to be limiting with respect to the architecture of the system 10. Accordingly, for example, some embodiments may have specific sets of devices 20, 50, 60 that are associated with corresponding specific servers that belong to or are utilized by a particular organization, entity or group over a single network (e.g. network 30). However, in other embodiments, multiple different sets of devices 20, 50, 60 may be enabled to access other servers associated with different organizations, entities or groups via the same or a different network.

The devices 20, 50, 60 may, in some cases, each include sensory, computing and/or communication devices associated with different devices 20, 50, 60 that belong to or are associated with a single organization, for example fleet management of devices 20, 50, 60 at a construction site. In another example, a first device 20, 50, 60 may be associated with a first facility or location of a first organization. Meanwhile, a second device may be associated with a second facility or location of the first organization. As such, for example, some of the devices 20, 50, 60 may be associated with the first organization, while other ones of the devices 20, 50, 60 are associated with a second organization. Thus, for example, the devices 20, 50, 60 may be remotely located from each other, collocated, or combinations thereof. However, in some embodiments, each of the devices 20, 50, 60 may be associated with individuals, locations or entities associated with different organizations or merely representing individual devices.

Each one of the construction devices 20 may include a housing inside which a power unit or motor (not shown) is housed. In some embodiments, the power unit may be an electric motor, an internal combustion engine, hydraulic system, pneumatic system, combustion chamber, or the like. The construction devices 20 may each further include a working element. The working element may be operated via the power unit to perform construction operations, such as drilling, cutting, demolishing, nailing, or the like. Various example types of construction devices 20 with which example embodiments may be associated should be understood to have corresponding different types of work elements (e.g. blades, cutting chains, drill bits, nailers, or the like). The construction devices 20 may include sensors for monitoring location, device operation, orientation, or the like, as discussed below in reference to FIG. 2.

Each of the personnel devices 50 may include sensors, such as location sensors, cameras, scanners, or the like. The personnel devices 50 may also include a user interface, as discussed below in reference to FIG. 2.

Each of the construction device batteries 60 may include a charging sensor.

In an example embodiment, each of the devices 20, 50, 60 may include onboard circuitry 22 which may include or otherwise be embodied as a computing device (e.g. a processor, microcontroller, processing circuitry, or the like) capable of communication with a network 30. As such, for example, each one of the devices 20, 50, 60 may include (or otherwise have access to) memory for storing instructions or applications for the performance of various functions and a corresponding processor for executing stored instructions or applications and a corresponding processor or processing circuitry. Each one of the devices 20, 50, 60 may also include software and/or corresponding hardware (e.g. the onboard circuitry 22) for enabling the performance of the respective functions of the clients as described below. In an example embodiment, one or more of the devices 20, 50, 60 may be configured to execute applications or functions implemented via software for enabling a respective one of the devices 20, 50, 60 to communicate with the network 30 for requesting and/or receiving information and/or services via the network 30 and/or for providing data to other devices via the network 30. The information or services receivable at the devices 20, 50, 60 may include deliverable components (e.g. downloadable software to configure the onboard circuitry 22 of the devices 20, 50, 60, or information for consumption or utilization at the onboard circuitry 22 of the devices 20, 50, 60).

The network 30 may be a data network, such as a local area network (LAN), a metropolitan area network (MAN), a wide area network (WAN) (e.g. the Internet), and/or the like, which may couple the devices 20, 50, 60 to devices such as processing elements (e.g. personal computers, server computers or the like) and/or databases. Communication between the network 30, the devices 20, 50, 60 and the devices or databases (e.g. servers) to which the devices 20, 50, 60 are coupled may be accomplished by either wired or wireless communication mechanisms and corresponding communication protocols.

In an example embodiment, other devices to which the devices 20, 50, 60 may be coupled via the network 30 may include a server network 32 including one or more application servers (e.g. application server 40), and/or a database server 42, which together may form respective elements of the server network 32. Although the application server 40 and the database server 42 are each referred to as "servers," this does not necessarily imply that they are embodied on separate servers or devices. As such, for example, a single server or device may include both entities and the database server 42 could merely be represented by a database or group of databases physically located on the same server or device as the application server 40. The application server 40 may include monitoring circuitry 44 (which may be similar to or different from the onboard circuitry 22 of the devices 20, 50, 60) that may include hardware and/or software for configuring the application server 40 to perform various functions. As such, for example, the application server 40 may include processing logic and memory enabling the application server 40 to access and/or execute stored computer readable instructions for performing various functions.

In an example embodiment, one function that may be provided by the application server 40 (e.g. via the monitoring circuitry 44) may be the provision of services relating to substitute construction device battery identification, as will be described in greater detail below. For example, the application server 40 may be local or remote and configured to receive data from the devices 20, 50, 60 and process the data to coordinate construction site operations, as described herein. Thus, for example, the onboard circuitry 22 may be configured to send the data to the application server 40 for the application server to coordinate construction site operations (e.g. monitor and/or deploy personnel and/or device 20, 50, 60 to locations throughout the construction site), or have actions associated therewith (e.g. send information, alerts, or safety interlocks to devices 20, 50, 60). In some embodiments, the application server 40 may be configured to provide devices 20, 50, 60 with instructions (e.g. for execution by the onboard circuitry 22) for taking prescribed actions when corresponding substitute construction device batteries are identified.

Accordingly, in some example embodiments, data from devices 20, 50, 60 may be provided to and analyzed at the application server 40 to identify or define a construction site status (CSS) (e.g. in real time or at a later time). The CSS may be associated with actions to be taken by the corresponding one of the devices 20, 50, 60 that sent the data (or another device within the construction site) in response to a future detection of the CSS. The application server 40 may then equip one or more of the devices 20, 50, 60 to detect the defined CSS in the future, and also provide instructions for actions to be taken when the defined CSS is encountered. Each one of the devices 20, 50, 60 that has received the instructions may then detect the defined CSS and take the appropriate action. In one example embodiment, for example, the CSS may include the identification of a substitute construction device battery for a construction device and in some instances providing the location data of the substitute construction device battery to an operator by causing the location data of the substitute construction device battery to be displayed on a user interface. The CSS may additionally or alternatively include the charging status of the battery.

Alternatively or additionally, data from devices 20, 50, 60 may be provided to and analyzed at the application server 40 (e.g. in real time) to identify or define a CSS. The CSS may be associated with actions to be taken by the application server 40 in response to a future detection of the CSS. The application server 40 may then provide a report or warning or may direct action to be taken at one or more devices 20, 50, 60 when an occurrence of the defined CSS is detected in the future.

In still other embodiments, the devices 20, 50, 60 themselves may analyze data for detection of CSSs (e.g. using the onboard circuitry 22) and define and/or take action responsive to detecting the occurrence of a defined CSS. Thus, the devices 20, 50, 60 may operate in some cases independently of the network 30 and the application server 40. However, in some cases, the application server 40 may be used to provide defined CSSs to the devices 20, 50, 60 and the devices 20, 50, 60 may be configured thereafter to operate to detect CSSs and take actions correspondingly.

In some embodiments, for example, the onboard circuitry 22 and/or the monitoring circuitry 44 may include or have access to stored instructions for handling activities associated with practicing example embodiments as described herein. As such, in some embodiments, the onboard circuitry 22 and/or the monitoring circuitry 44 may include software and/or hardware for enabling the onboard circuitry 22 and/or the monitoring circuitry 44 to communicate via the network 30 for the provision and/or receipt of information associated with performing activities as described herein.

Figure 2:
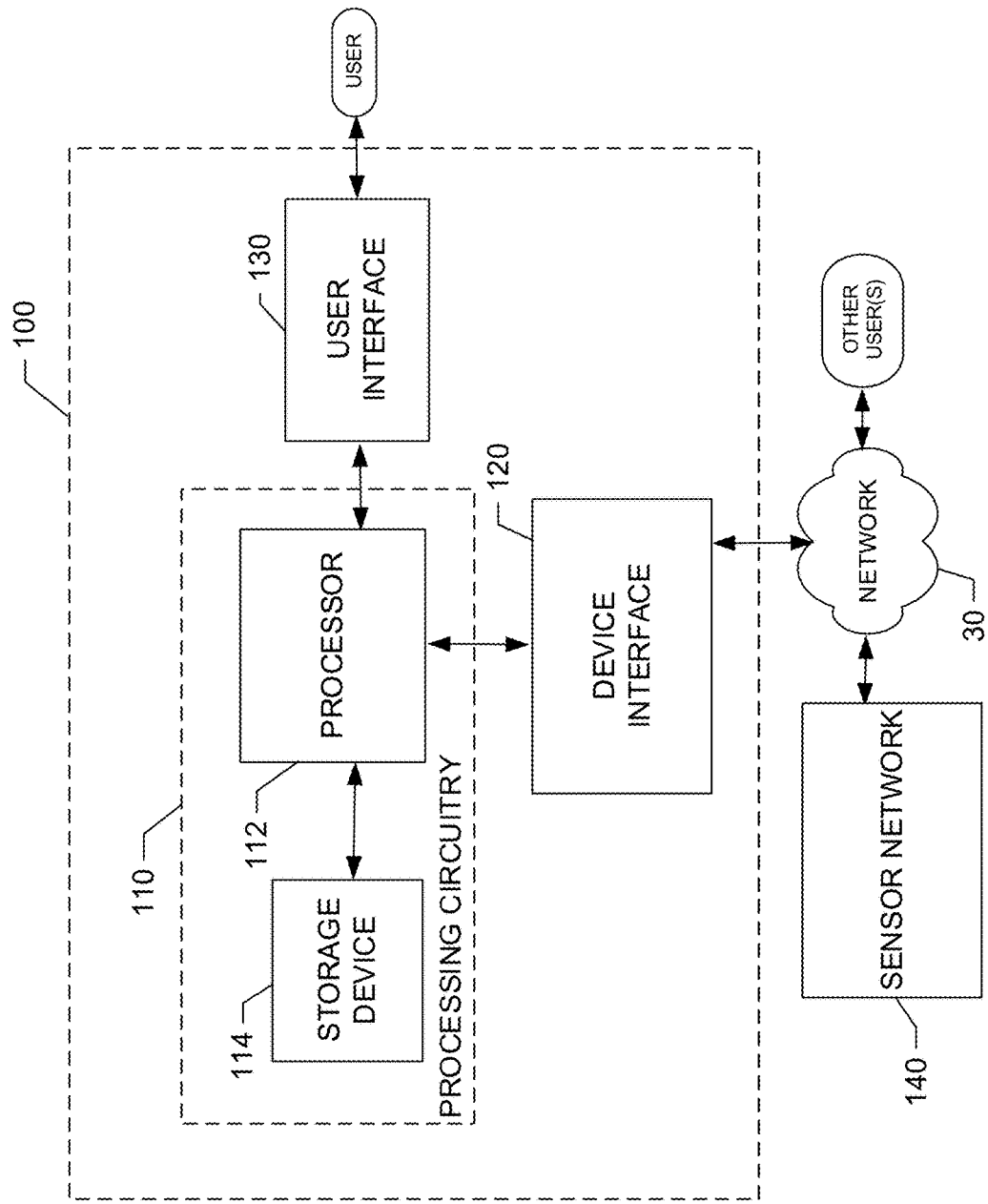
FIG. 2 illustrates a block diagram of one example of onboard electronics or monitoring circuitry that may be used in connection with employment of an example embodiment.

The system 10 of FIG. 1 may support CSS definition, detection and responses to detection on the basis of the execution of functionality that is executed using either or both of the onboard circuitry 22 and the monitoring circuitry 44. FIG. 2 illustrates a block diagram showing components that may be associated with embodiment of the onboard circuitry 22 and/or the monitoring circuitry 44 according to an example embodiment. As shown in FIG. 2, the onboard circuitry 22 and/or the monitoring circuitry 44 may include or otherwise be embodied as a CSS monitoring device 100. The CSS monitoring device may be embodied in a construction device 20, a personnel device 50, a construction device battery 60, a separate computing device, or be distributed among the devices 20, 50, 60, and/or a separate computing device. The CSS monitoring device 100 may include processing circuitry 110 of an example embodiment, as described herein. In this regard, for example, the CSS monitoring device 100 may utilize the processing circuitry 110 to provide electronic control inputs to one or more functional units of the onboard circuitry 22 and/or the monitoring circuitry 44 and to process data generated by the one or more functional units regarding various indications of device activity (e.g. operational parameters and/or location information) relating to a corresponding one of the devices 20, 50, 60. In some cases, the processing circuitry 110 may be configured to perform data processing, control function execution and/or other processing and management services according to an example embodiment of the present invention. In some embodiments, the processing circuitry 110 may be embodied as a chip or chip set. In other words, the processing circuitry 110 may comprise one or more physical packages (e.g. chips) including materials, components and/or wires on a structural assembly (e.g. a baseboard). The structural assembly may provide physical strength, conservation of size, and/or limitation of electrical interaction for component circuitry included thereon. The processing circuitry 110 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 110 may include one or more instances of a processor 112 and memory 114 that may be in communication with or otherwise control a device interface 120 and, in some cases, a user interface 130. As such, the processing circuitry 110 may be embodied as a circuit chip (e.g. an integrated circuit chip) configured (e.g. with hardware, software or a combination of hardware and software) to perform operations described herein. However, in some embodiments, the processing circuitry 110 may be embodied as a portion of an on-board computer on a device being monitored (e.g. one of the devices 20, 50, 60), while in other embodiments, the processing circuitry 110 may be embodied as a remote computer that monitors device activity for one or more devices.

The user interface 130 may be in communication with the processing circuitry 110 to receive an indication of a user input at the user interface 130 and/or to provide an audible, visual, tactile or other output to the user. As such, the user interface 130 may include, for example, a display, one or more levers, switches, buttons or keys (e.g. function buttons), and/or other input/output mechanisms. In an example embodiment, the user interface 130 may include one or a plurality of lights, a display, a speaker, a tone generator, a vibration unit and/or the like.

The device interface 120 may include one or more interface mechanisms for enabling communication with other devices (e.g. sensors of the sensor network 140, or functional units of the CSS monitoring device 100 or other construction equipment on which an example embodiment may be employed). In some cases, the device interface 120 may be any means such as a device or circuitry embodied in either hardware, or a combination of hardware and software that is configured to receive and/or transmit data from/to sensors in communication with the processing circuitry 110 via internal communication systems of the CSS monitoring device 100. In some cases, the device interface 120 may further include wireless communication equipment (e.g. a one way or two way radio) for at least communicating information from the CSS monitoring device 100 to a network and, in the case of a two way radio, in some cases receiving information from a network.

The processor 112 may be embodied in a number of different ways. For example, the processor 112 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 112 may be configured to execute instructions stored in the memory 114 or otherwise accessible to the processor 112. As such, whether configured by hardware or by a combination of hardware and software, the processor 112 may represent an entity (e.g. physically embodied in circuitry—in the form of processing circuitry 110) capable of performing operations according to embodiments of the present invention while configured accordingly. Thus, for example, when the processor 112 is embodied as an ASIC, FPGA or the like, the processor 112 may be specifically configured hardware for conducting the operations described herein. Alternatively, as another example, when the processor 112 is embodied as an executor of software instructions, the instructions may specifically configure the processor 112 to perform the operations described herein.

In an example embodiment, the processor 112 (or the processing circuitry 110) may be embodied as, include or otherwise control the operation of the CSS monitoring device 100 based on inputs received by the processing circuitry 110. As such, in some embodiments, the processor 112 (or the processing circuitry 110) may be said to cause each of the operations described in connection with the CSS monitoring device 100 in relation to operation the CSS monitoring device 100 relative to undertaking the corresponding functionalities associated therewith responsive to execution of instructions or algorithms configuring the processor 112 (or processing circuitry 110) accordingly.

In an exemplary embodiment, the memory 114 may include one or more non-transitory memory devices such as, for example, volatile and/or non-volatile memory that may be either fixed or removable. The memory 114 may be configured to store information, data, applications, instructions or the like for enabling the processing circuitry 110 to carry out various functions in accordance with exemplary embodiments of the present invention. For example, the memory 114 could be configured to buffer input data for processing by the processor 112. Additionally or alternatively, the memory 114 could be configured to store instructions for execution by the processor 112. As yet another alternative or additional capability, the memory 114 may include one or more databases that may store a variety of data sets responsive to input from the sensor network 140, the CSS monitoring device 100, or any other functional units that may be associated with the CSS monitoring device 100. Among the contents of the memory 114, applications may be stored for execution by the processor 112 in order to carry out the functionality associated with each respective application. In some cases, the applications may include instructions for determining a substitute construction device battery, as described herein. Additionally or alternatively, the applications may prescribe particular reporting paradigms or protocols for reporting of information from the CSS monitoring device 100 to a network device using the device interface 120.

In some embodiments, the processing circuitry 110 may communicate with electronic components and/or sensors of a sensor network 140 (e.g. sensors that measure variable values related to device operational parameters like charge status, RPM, temperature, oil pressure, and/or the like, and/or sensors that measure device movement employing movement sensor circuitry) of the construction device 20 via the device interface 120. In one embodiment, sensors of the sensor network 140 of one or more ones of the devices 20, 50, 60 may communicate with the processing circuitry 110 of a remote monitoring computer via the network 30 and the device interface 120 using wireless communication or by downloading data that is transferred using a removable memory device that is first in communication with the construction device 20 to load data indicative of device activity, and is then (e.g. via the device interface 120) in communication with the remote monitoring computer (e.g. associated with the monitoring circuitry 44).

In some embodiments, the processing circuitry 110 may communicate with movement sensor circuitry of the devices 20, 50, 60 (e.g. when the processing circuitry 110 is implemented as the onboard circuitry 22), or may receive information indicative of device location from movement sensor circuitry of one or more devices being monitored (e.g. when the processing circuitry is implemented as the monitoring circuitry 44). The movement sensor circuitry may include movement sensors (e.g. portions of the sensor network 140) such as one or more accelerometers and/or gyroscopes, or may include global positioning system (GPS) or other location determining equipment.

The movement sensor circuitry (if employed) may be configured to provide indications of movement of the devices 20, 50, 60 based on data provided by the one or more accelerometers and/or gyroscopes, and/or based on GPS or local position determining capabilities. In other words, the movement sensor circuitry may be configured to detect movement of the devices 20, 50, 60 based on inertia-related measurements or other location determining information. In some example embodiments, the movement sensor circuitry may include orientation sensors, configured to detect the orientation of a device, particularly the working element of the device relative a determined location.

Figure 3:
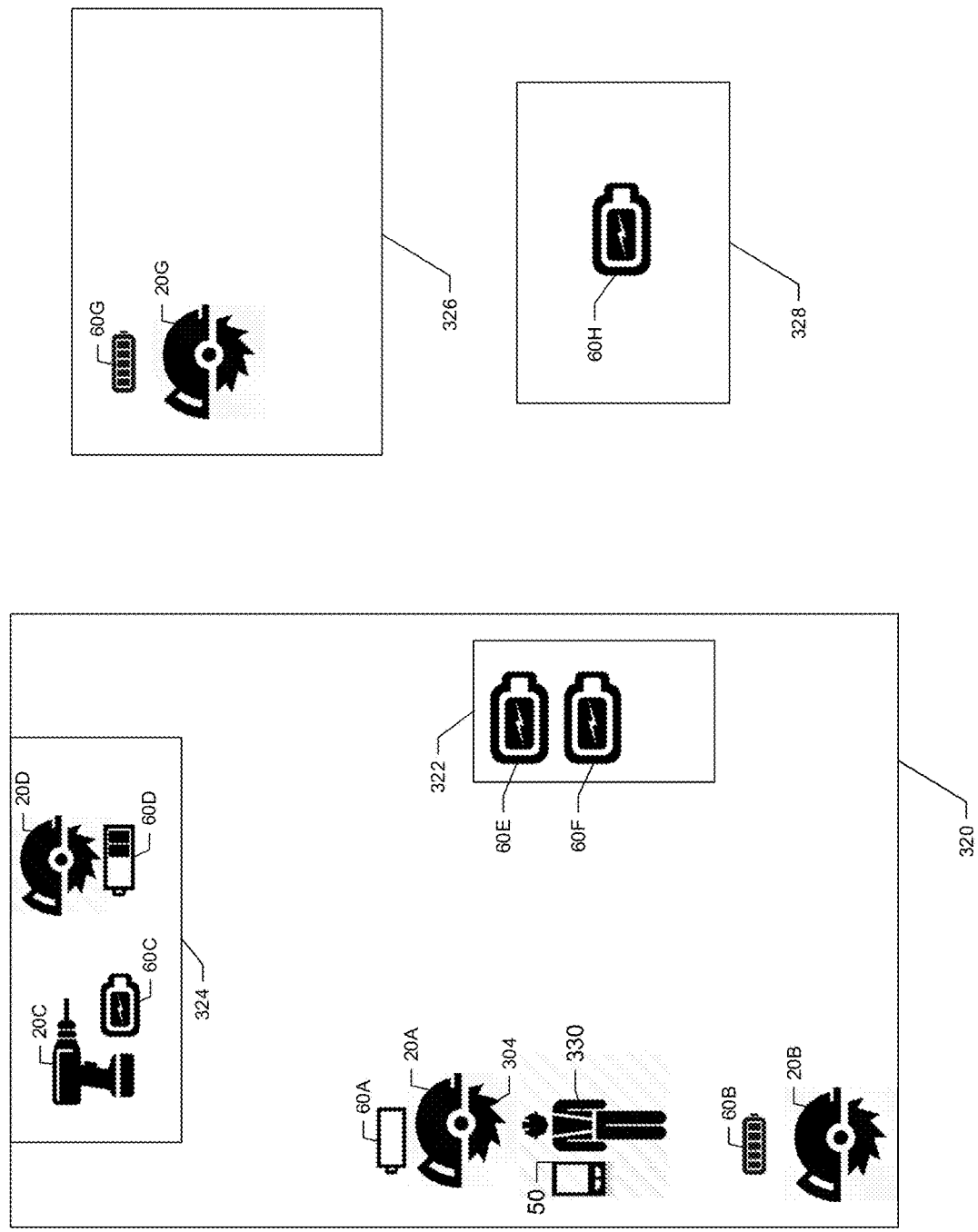
FIG. 3 illustrates an example construction site according to an example embodiment.

FIG. 3 illustrates an example construction site 320 according to an example embodiment. The construction site 320 may include one or more construction devices 20, such as saws, drills, grinders, or the like. The construction device 20 may include a working element 304, such as a blade, drill bit, grinding head, nailer, or the like, configured to perform work such as cutting, drilling, grinding or fastening, on a working material. The construction devices 20 may utilize a construction device battery 60 for electrical power to operate at least a portion of the construction device 20, such as the working element 304. A CSS may include determining a substitute construction device battery 60B for a construction device 20 based on battery identifiers and/or location data associated with a plurality of construction device batteries 306.

In an example embodiment, a construction site 320 may include a plurality of construction device batteries 60. The CSS monitoring device 100 may receive battery identifier data, e.g. battery identifiers, from the respective construction device batteries 60 directly or via a construction device 20. The battery identifiers may include data indicative of the make/model, battery configuration (e.g. physical and electrical configuration), battery voltage, Amp hour rating, or the like, of a construction device battery 60, for example Husqvarna BLi160, physical dimensions, contact locations, 36 Volt, 4.5 Ah, or the like.

The CSS monitoring device 100 may also receive location data from the respective construction device batteries 60. The location data may be an actual location or a proximate location derived from a location sensor, such as a portion of the sensor network 140, associated with the respective construction device batteries 60 or construction devices 20 and/or personnel devices 50 associated with the construction device battery 60.

The CSS monitoring device 100 may determine a substitute construction device battery 60 based on the battery identifiers and/or the location data associated with the current construction device batteries 60A. The CSS monitoring device 100 may determine a substitute device battery 60 based on the battery identifiers, such as exact matches of the make/model data, and/or battery configuration, voltage, and/or amp hour ratings. In some embodiments, the substitute construction device battery 60 may be determined based on the most specific battery identifier match, e.g. make/model, then battery configuration match. For example, a construction device battery 60B including battery identifier of Husqvarna BLi 160, 36 V, 4.5 Ah may be selected as the substitute construction device battery 60A. In the absence of a make model/match, a construction device battery 60E associated with a battery identifier Husqvarna BLi 150, 36 V, 4.2 Ah, may match the battery configuration and the voltage rating and be the next preferred substitute construction device battery 60.

In some example embodiments, the CSS monitoring device 100 may use the location data to identify the substitute construction device battery 60, for example the proximity to the current construction device battery 60A. In some instances, proximity thresholds, e.g. predetermined radii, such as 500 ft, 1000 ft, or the like, from the current construction device battery 60A may be used to determine the substitute construction device battery 60. In an example embodiment, a subordinate battery identifier match may be determined to be the substitute construction device battery 60 within a first radius, over a superior, e.g. more specific, battery identifier match in a second or third radii. For example, a construction device battery 60E with a battery identifier of Husqvarna BLi 150, 36 V, 4.2 Ah at a distance of 150 feet, within the first radius, e.g. 500 ft around the current construction device battery 60A, may be determined to be the substitute construction device battery 60B over a construction device battery 60D, which is at a distance of 550 feet, within in a second radius, e.g. 500-1000 ft, with a battery identifier Husqvarna BLi 160, 36 V, 4.5 Ah.

In some example embodiments, the battery identifier and location data may be received from construction devices 20 and/or construction device batteries 60 which are in data communications with the network 30 which, in some instances, may be remote from the construction site 320. In some examples the remote locations may include, without limitation, remote or neighboring construction sites 326, such as construction device 20G and construction device battery 60G, a neighbor's garage, or retail locations 328, such as construction device battery 60H. In some example embodiments, the proximity thresholds may be defined by the network connected locations, for example the first proximity threshold may be the local construction site 320, the second proximity threshold may be remote or neighboring construction sites 326, and a third proximity threshold may be retail locations 328.

In an example embodiment, the construction site may include local location perimeters, such as a battery charging area 322, construction device storage 324, and the construction site 320, e.g. the construction site perimeter. In some example embodiments, the proximity thresholds may be defined by the local location perimeters, for example the first proximity threshold may be a battery charging area 322, the second proximity threshold may be a construction device storage 324, and a third proximity threshold may be a construction site 320. For example, FIG. 3 depicts construction device 20C with construction device battery 60C and construction device 20D with construction device battery 60D within a proximity threshold of the construction device storage area 324. Construction device batteries 60E and 60F are depicted within the proximity threshold of the battery charging area 322.

In some example embodiments, the CSS monitoring device 100 may receive battery data from the construction devices batteries 60. In an example embodiment, the battery data may be indicative of a charging condition of a construction device battery 60, such as fully charged, partially charged (e.g. a fraction or percent charged), charging, or the like, as discussed below in FIG. 4. The battery data may be indicative of operational status, such as normal or malfunctioning. A malfunction may be indicated in an instance in which a component failure is detected, such as high temperature of a battery cell, a short, low voltage, or the like. Additionally or alternatively, the battery data may be indicative of an availability, such as "in use," "idle," "available," or the like. The battery data may enable the CSS monitoring device 100 to determine substitute device batteries 60B based on charge status, operability, and/or availability of the construction device batteries 60. The CSS monitoring device 100 may determine a substitute device 60 based on construction device batteries 60 which are associated with battery data indicative of a fully charged, operational, and/or available construction device, over partially charged or idle construction device batteries 60. The CSS monitoring device 100 may exclude malfunctioning, no charge and/or in use construction device batteries 60. For example, the CSS monitoring device may determine construction device battery 60E as the substitute construction device battery, with battery data indicative of a full charge, normal, and available over construction device battery 60B with battery data indicative of a full charge, normal, and in use, or construction device battery 60D with battery data indicative of a partial or low charge, normal, and available.

In an example embodiment, selection criteria for the substitute device battery may be received from an operator, such as via a personnel device 50. The selection criteria may define priorities for battery identifier matches, thresholds, or the like, for example the operator may specify the closest construction device battery 60 including a battery identifier with a battery type match, a make/model match within the construction site 320, or the like.

In an example embodiment, the location data associated with the substitute construction device battery 60B may be displayed on a user interface 130 for use by the operator 330. The user interface 130 may be associated with the construction device 20, a personnel device 50, or the CSS monitoring device 100. In some example embodiments, the location data associated with the substitute construction device battery 60B may be displayed based on a request by the operator 330, such as a selection in a CSS monitoring program or application running on the CSS monitoring device 100 or personnel device 50.

Additionally or alternatively, the location data associated with the substitute construction device battery 60B may be displayed automatically based on battery data associated the construction device battery 60A. The CSS monitoring device 100 may automatically cause the location data of the substitute construction device battery 60B to be displayed in an instance in which the construction device battery 60A battery data satisfies a predetermined replacement threshold, such as indicates a low charge (e.g. 20%, 10%, or the like) or no charge status, and/or a malfunctioning operational status.

In some example embodiments, the CSS monitoring device 100 may cause the location data of other construction devices batteries 60 which match at least a portion of the battery identifier of the current construction device battery 60A and which have not been selected as the substitute construction device battery 20B. In an example embodiment, construction device batteries 60 which include battery data such as in use, idle, or malfunctioning; which are beyond a proximity threshold; which have a subordinate battery identifier match; or the like, may be displayed. In some example embodiments, the location data associated with all of the construction device batteries 60 which match at least a portion of the battery identifier of the current construction device battery 60A and which have not been selected as the substitute construction device battery 60B may be displayed. In an example embodiment, the location data may include indicators of charging or operational status, as discussed below in reference to FIG. 4, and one or more location perimeters, such as the construction site 320, battery charging area 322, the construction site storage 324, remote construction sites 326, and/or retail locations 328. In an instance in with the construction device battery 60 is associated with, such as installed in, a construction device 20, a construction device indicator may be displayed in relation to the construction device battery location.

Figure 4:
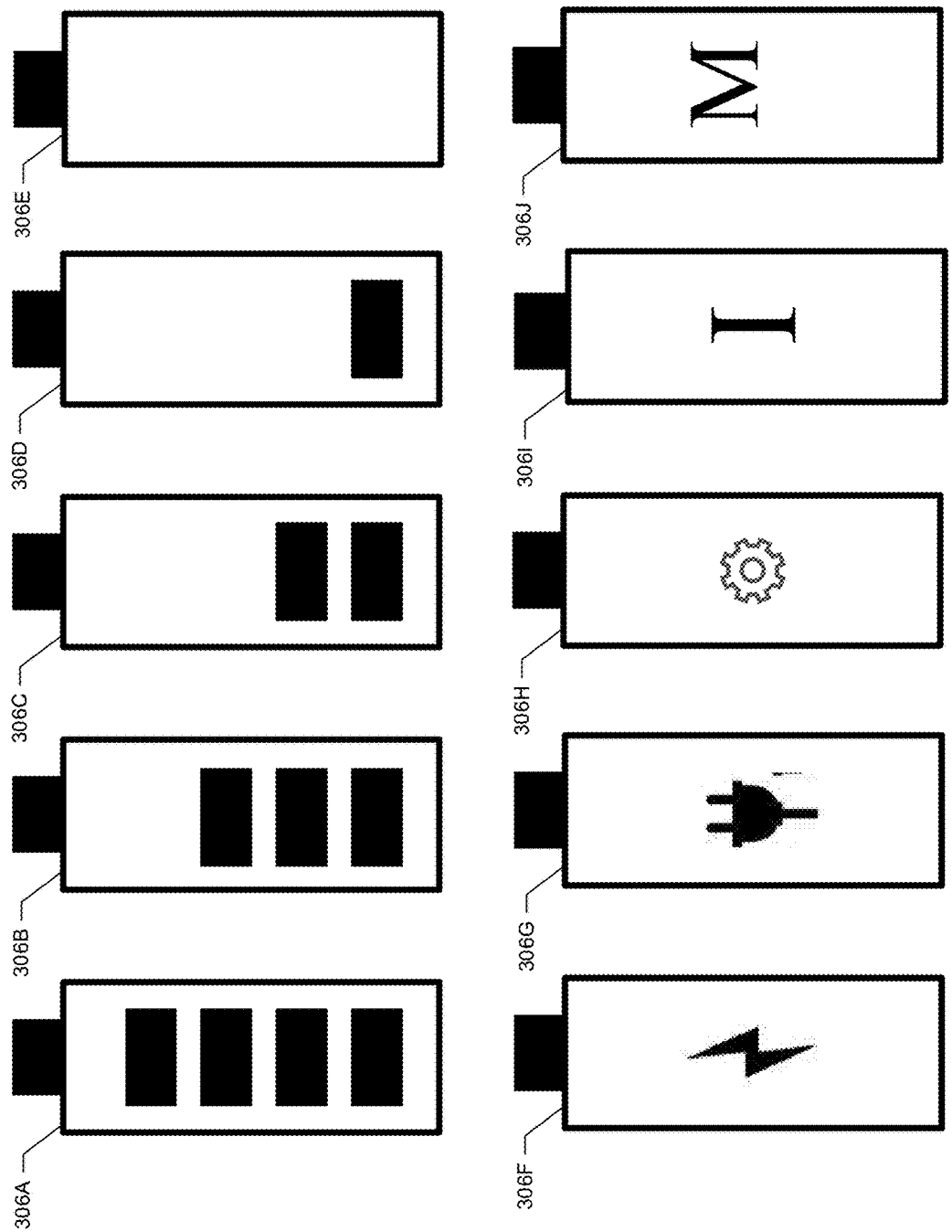
FIG. 4 illustrates example battery status indicators according to an example embodiment.

FIG. 4 illustrates example battery status indicators according to an example embodiment. Battery status indicators 306A-I depict a normal operational status, in various availability and charge statuses. Battery charging indicator 306J depicts a malfunctioning operational status with an "M". Battery charging indicator 306H depicts an "in use" availability status with a gear, such as a construction device 20 that is currently drawing power from the construction device battery. Battery status indicator 306I depicts an idle availability status with an "I", such as a construction device battery 60 installed in a construction device 20, but not currently in use.

Battery status indicators 306A-306E indicates a charge status of a construction battery 60 from fully charged 306A to no charge 306E, bars indicating the fraction or percentage of charge. Battery status indicator 306F depicts a battery charge status of charging with a lightning bolt and battery charging indicator 306G depicts a battery charge status of connected to a power source with a electrical plug, but not charging, such as a fully charged construction device battery 60 in a battery charger. The battery status indicators depicted and described are merely for illustrative purposes and one of ordinary skilling the art would immediately appreciate that other indicators may be used to indicate the described or additional battery statuses.

Returning to FIG. 3, the CSS monitoring device 100 may compare the location data associated with the construction device batteries 60 to a loss prevention threshold, e.g. a predefined area, such as a construction site 320, retail location 328, or the like. In an instance in which the location data for a construction device battery 60 satisfies the loss prevention threshold, e.g. the construction device battery 60 has moved beyond the perimeter of the construction site 320, passed a gate of the construction site 320, or has been removed from the retail location 328, the CSS monitoring device 100 may disable the construction device battery 60. Disabling the construction device battery 60 may include an electrical, mechanical, or programmatic disruption of power to one or more of the construction device batteries 60 preventing electrical power from flowing from the construction device battery 60 to a construction device 20. In an example embodiment, an alert, warning, or notification may be sent to personnel device 50 to inform or alert the operator 330 that the construction device battery 60 has been removed from the construction site. For example, in an instance in which construction device battery 60B satisfies the loss prevention threshold, such as being removed intentionally or unintentionally from the construction site 320, the CSS monitoring device 100 may disable the construction device battery 60 and send an alert to the personnel device 50 alerting the operator 330 of the batteries movement. In some embodiments, the CSS monitoring device may include the location or last known location of the construction device battery 60 as a portion of the alert.

Figure 5:
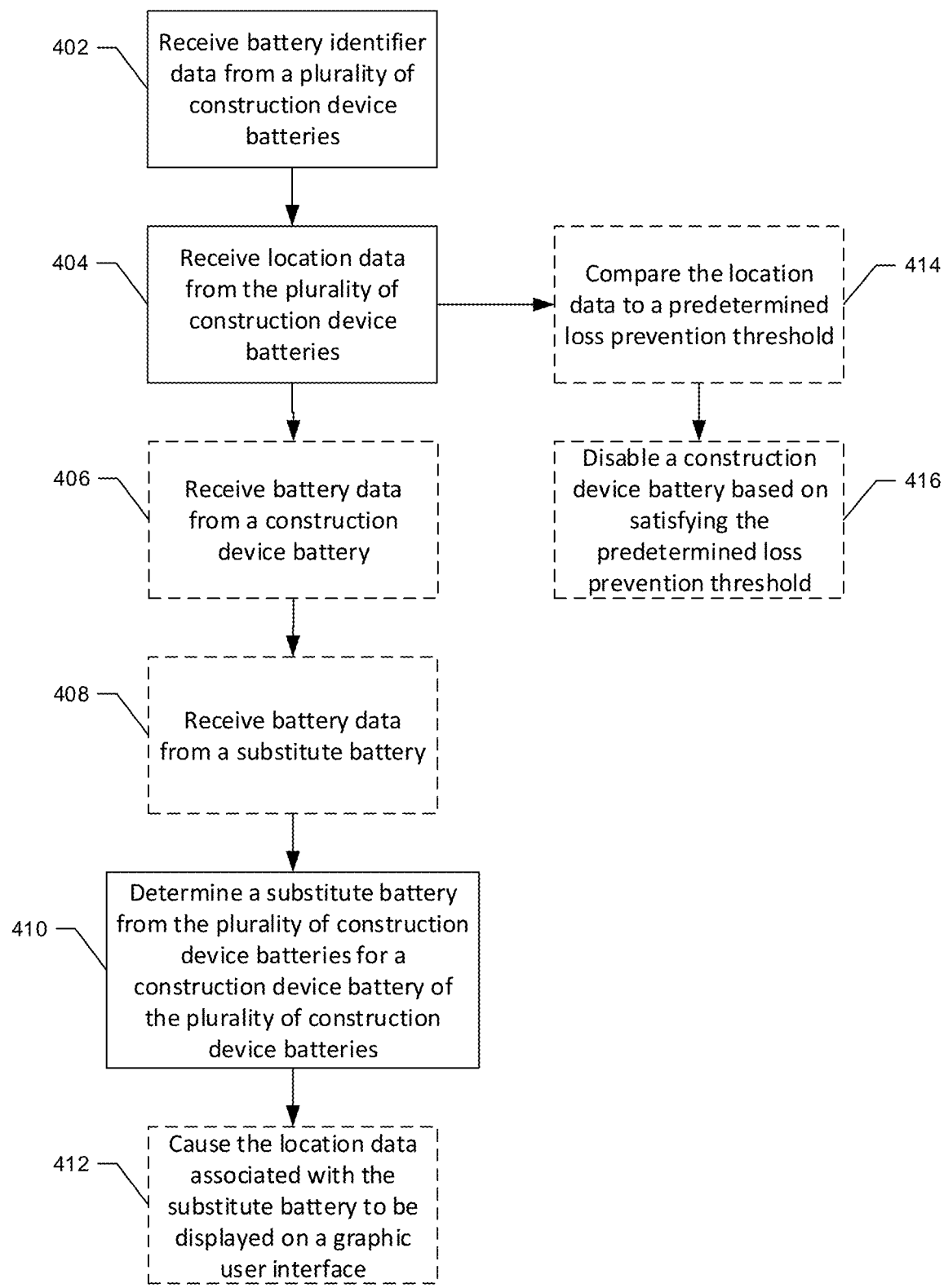
FIG. 5 illustrates a method of utilizing a construction site status monitoring device in relation to operation of a construction device according to an example embodiment.

In some cases, a method of utilizing CSS analysis in relation to operation of the CSS monitoring device 100 and/or one or more construction devices 20 according to an example embodiment may be provided. FIG. 5 illustrates a block diagram of some activities that may be associated with one example of such a method. In some embodiments, the processing circuitry 110 (which may include a processor capable of executing instructions stored in a non-transitory computer readable medium/memory) may be configured to implement a control algorithm for the CSS monitoring device 100 and/or the one or more construction tools according to the method.

In an example embodiment, the method may include receiving a battery identifier from a plurality of construction device batteries at operation 402, receive location data from the plurality of construction device batteries at operation 404, and determining a substitute construction device battery from the plurality of construction device batteries for a construction device battery of the plurality of construction device batteries based on the battery identifiers or location data at operation 410.

In some embodiments, the method may include additional, optional operations, and/or the operations described above may be modified or augmented. Some examples of modifications, optional operations, and augmentations are described below, as indicated by dashed lines, such as, receiving battery data from the construction device battery at operation 406, receiving battery data from the substitute construction device battery at operation 408, and causing the location data associated with the substitute construction device battery to be displayed on a user interface at operation 412. In an example embodiment, the method may also include comparing the location data to a predetermined loss prevention threshold at operation 414 and disabling a construction device battery based on satisfying the predetermined loss prevention threshold at operation 416.

In an example embodiment, the CSS monitoring device may comprise a processor (e.g. the processor 112) or processing circuitry 110 configured to perform some or each of the operations (402-416) described above. The processor 112 may, for example, be configured to perform the operations (402-416) by performing hardware implemented logical functions, executing stored instructions, or executing algorithms for performing each of the operations. In some embodiments, the processor 112 or processing circuitry 110 may be further configured for additional operations or optional modifications to operations 402-416. In this regard, for example, the processing circuitry is further configured to receive battery data associated with the construction device battery. In an example embodiment, the battery data is indicative of the charge status of the construction device battery. In some example embodiments, the charge status of the construction device battery satisfies a predetermined replacement threshold. In an example embodiment, the battery data is indicative of a malfunction. In some example embodiments, the processing circuitry is further configured to receive battery data from the substitute battery. In an example embodiment, the battery data is indicative of a charge status of the substitute battery. In some example embodiments, the battery data is indicative of availability of the substitute battery. In an example embodiment, the processing circuitry is further configured to cause the location data associated with the substitute battery to be displayed on a graphic user interface. In some example embodiments, the satisfying the loss prevention threshold is indicative of the construction device battery leaving a predefined area.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed is:

1. A construction site status monitoring device comprising processing circuitry configured to:
   receive battery identifier data associated with a plurality of construction device batteries, the plurality of construction batteries comprising a first construction device battery that is installed in a first construction device located on a construction site and a second construction device battery that is installed in a second construction device located on the construction site, the first construction device battery being configured to provide power to the first construction device to operate a first working element of the first construction device and the second construction device battery being configured to provide power to the second construction device to operate a second working element of the second construction device;
   receive location data associated with the plurality of construction device batteries;
   determine that the first construction device battery satisfies a predetermined replacement threshold, wherein being configured to determine that the first construction device battery satisfies the predetermined replacement threshold includes being configured to determine, from a charging sensor on the first construction device battery or on the first construction device, that a charge status of the first construction device battery is below a charge threshold; and
   determine, in response to determining that the first construction device battery satisfies the predetermined replacement threshold, a substitute battery from the plurality of construction device batteries for the first construction device battery based on the battery identifier data and the location data, wherein the substitute battery is the second construction device battery.

2. The construction site status monitoring device of claim 1, wherein the processing circuitry is further configured to:
   receive battery data associated with the first construction device battery.

3. The construction site status monitoring device of claim 2, wherein the battery data is indicative of the charge status of the first construction device battery.

4. The construction site status monitoring device of claim 1, wherein the processing circuitry is further configured to:

determine, based on the location data, proximity threshold relationships between location of the construction device batteries and a plurality of defined proximity thresholds; and determine the substitute battery based on the proximity threshold relationships.

5. The construction site status monitoring device of claim 2, where the battery data is indicative of a malfunction.

6. The construction site status monitoring device of claim 1, wherein processing circuitry is further configured to:
receive battery data from the substitute battery.

7. The construction site status monitoring device of claim 6, wherein the battery data is indicative of a charge status of the substitute battery.

8. The construction site status monitoring device of claim 6, wherein the battery data is indicative of an availability of the substitute battery, wherein the availability of the substitute battery is an indication of whether the substitute battery is in use and installed in a construction device, idle and installed in a construction device, or available as uninstalled in a construction device.

9. The construction site status monitoring device of claim 1, wherein the processing circuitry is further configured to:
cause the location data associated with the substitute battery to be displayed on a graphic user interface.

10. The construction site status monitoring device of claim 1, wherein the processing circuitry is further configured to display representations of construction device batteries within the plurality of construction device batteries that have not been selected as the substitute battery and match at least a portion of battery identifier data of the first construction device battery.

11. A construction site status monitoring system comprising:
a plurality of construction device batteries comprising a first construction device battery that is installed in a first construction device located on a construction site and a second construction device battery that is installed in a second construction device located on the construction site, the first construction device battery being configured to provide power to the first construction device to operate a first working element of the first construction device and the second construction device battery being configured to provide power to the second construction device to operate a second working element of the second construction device; and
a construction site status monitoring device comprising processing circuitry configured to:
receive battery identifier data associated the plurality of construction device batteries;
receive location data associated with the plurality of construction device batteries;
determine that the first construction device battery satisfies a predetermined replacement threshold, wherein being configured to determine that the first construction device battery satisfies the predetermined replacement threshold includes being configured to determine, from a charging sensor on the first construction device battery or on the first construction device, that a charge status of the first construction device battery is below a charge threshold; and
determine a substitute battery from the plurality of construction device batteries for the first construction device battery based on the battery identifier data and the location data, wherein the substitute battery is the second construction device battery.

12. The construction site status monitoring system of claim 11, wherein the processing circuitry is further configured to:
receive battery data associated with the first construction device battery.

13. The construction site status monitoring system of claim 12, wherein the battery data is indicative of the charge status of the first construction device battery.

14. The construction site status monitoring system of claim 11, wherein the processing circuitry is further configured to:
determine, based on the location data, proximity threshold relationship between locations of the construction device batteries and a plurality of defined proximity thresholds; and
determine the substitute battery based on the proximity threshold relationships.

15. The construction site status monitoring system of claim 12, where the battery data is indicative of a malfunction.

16. The construction site status monitoring system of claim 11, wherein processing circuitry is further configured to:
receive battery data from the substitute battery.

17. The construction site status monitoring system of claim 16, wherein the battery data is indicative of a charge status of the substitute battery.

18. The construction site status monitoring system of claim 16, wherein the battery data is indicative of availability of the substitute battery.

19. The construction site status monitoring system of claim 11, wherein the processing circuitry is further configured to:
cause the location data associated with the substitute battery to be displayed on a graphic user interface.

20. A construction site status monitoring device comprising processing circuitry configured to:
receive battery identifier data associated with a plurality of construction device batteries, the battery identifier data including make/model identifiers for each construction device battery, and the plurality of construction device batteries including construction device batteries having different make/model identifiers;
receive location data associated the plurality of construction device batteries, the location data indicating a location for each construction device battery;
determine that a construction device battery within the plurality of construction device batteries satisfies a predetermined replacement threshold, wherein being configured to determine that the construction device battery satisfies the predetermined replacement threshold includes being configured to determine, from a charging sensor on the construction device battery or on a construction device using the construction device battery, that the charge status of the construction device battery is below a charge threshold; and
determine, in response to determining that the construction device battery satisfies the predetermined replacement threshold, a substitute battery from the plurality of construction device batteries for the construction device battery based on the make/model identifiers and the location data, wherein being configured to determine the substitute battery includes being configured to determine that the substitute battery is not a match with respect to the make/model identifiers, but is closer with respect to location to the construction device battery than another substitute battery that is a match with respect to the make/model identifiers.

* * * * *